(12) United States Patent
Jensen

(10) Patent No.: US 11,877,580 B2
(45) Date of Patent: Jan. 23, 2024

(54) SLAUGHTERED PIG PART PROCESSING PLANT, A CLAMP STRUCTURE FOR RETAINING A SLAUGHTERED PIG PART, AND A METHOD OF RETAINING A SLAUGHTERED PIG PART BY A CLAMP STRUCTURE

(71) Applicant: FRONTMATEC GROUP APS, Kolding (DK)

(72) Inventor: Andreas Iskov Jensen, Sydals (DK)

(73) Assignee: FRONTMATEC GROUP APS, Kolding (DK)

( * ) Notice: Subject to any disclaimer, the term of this patent is extended or adjusted under 35 U.S.C. 154(b) by 217 days.

(21) Appl. No.: 17/439,312

(22) PCT Filed: Mar. 12, 2020

(86) PCT No.: PCT/EP2020/056670
§ 371 (c)(1),
(2) Date: Sep. 14, 2021

(87) PCT Pub. No.: WO2020/187692
PCT Pub. Date: Sep. 24, 2020

(65) Prior Publication Data
US 2022/0151248 A1    May 19, 2022

(30) Foreign Application Priority Data

Mar. 15, 2019  (DK) .............................. PA201970166
Mar. 25, 2019  (DK) .............................. PA201970183

(51) Int. Cl.
*A22C 15/00*         (2006.01)
(52) U.S. Cl.
CPC .................................. *A22C 15/003* (2013.01)
(58) Field of Classification Search
CPC ............................. A22C 15/003; A22B 7/002
(Continued)

(56) References Cited

U.S. PATENT DOCUMENTS 3,194,599 A     7/1965  Ambill
3,326,138 A *   6/1967  Thomas ................. A22B 7/003
                                                         104/93

(Continued)

FOREIGN PATENT DOCUMENTS

EP     1 658 774 A1    5/2006
EP     2 845 488 A1    3/2015
(Continued)

OTHER PUBLICATIONS

International Search Report (15 pages) from corresponding PCT Application PCT/EP/2020/056670 dated Jun. 18, 2020.

(Continued)

*Primary Examiner* — Richard T Price, Jr.
(74) *Attorney, Agent, or Firm* — Crowell & Moring LLP; John C. Freeman

(57) ABSTRACT

A slaughtered pig part processing plant including pig part processing stations and a conveyor supporting, via respective couplings, spaced apart clamp structures, the conveyor advancing the couplings with a respective clamp structure in a machine direction (T) from a first station towards a last station, wherein the clamp structures each including a carrier part carrying two jaws, each jaw having an edge oriented towards the edge of the other jaw, the edges defining between them a gap (G1), at least one of the jaws being mounted to turn relative to the carrier part from a first position to second positions where the gap (G1) is opened up, wherein a force applied against the first face turns the jaw(s) from the first position, a biasing force biasing the jaw(s) towards the first position when the clamp structures move away from the first station.

18 Claims, 13 Drawing Sheets

(58) Field of Classification Search
USPC .......................................................... 452/177
See application file for complete search history.

(56) References Cited

U.S. PATENT DOCUMENTS

| | | | | |
|---|---|---|---|---|
| 3,837,699 | A | * | 9/1974 | Anderson .............. A22B 7/001 |
| | | | | 452/187 |
| 2012/0315834 | A1 | | 12/2012 | Van Der Steen et al. |
| 2013/0029574 | A1 | | 1/2013 | Van Der Steen et al. |
| 2015/0173376 | A1 | | 6/2015 | Janssen et al. |
| 2016/0037787 | A1 | | 2/2016 | Van Der Steen et al. |

FOREIGN PATENT DOCUMENTS

| | | |
|---|---|---|
| EP | 3 320 780 A1 | 5/2018 |
| EP | 2 512 254 B1 | 3/2019 |
| GB | 406793 A | 3/1934 |
| WO | 2010/110680 A1 | 9/2010 |
| WO | 2011/074966 A1 | 6/2011 |
| WO | 2014/007607 A1 | 1/2014 |

OTHER PUBLICATIONS

Danish Office Action (8 pages) from Corresponding Danish Application PA 2019 70166 dated Oct. 18, 2019.

* cited by examiner

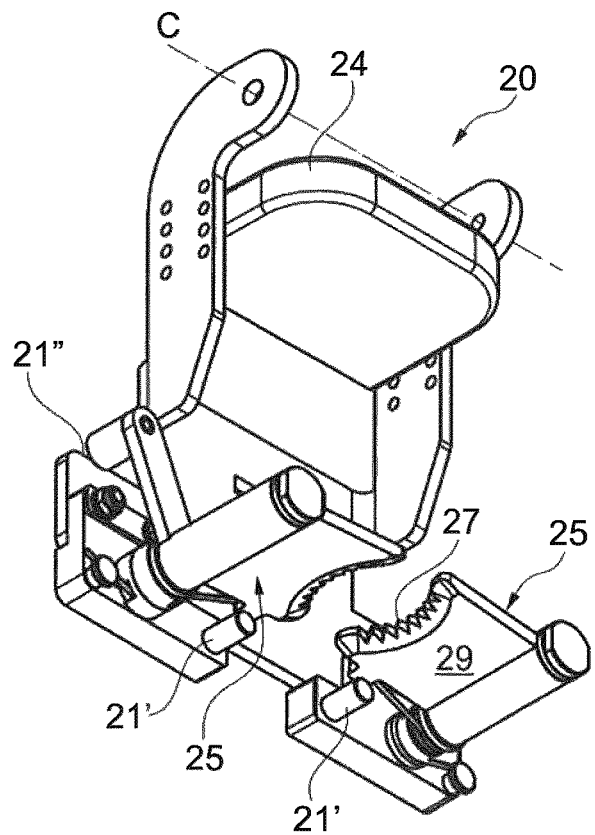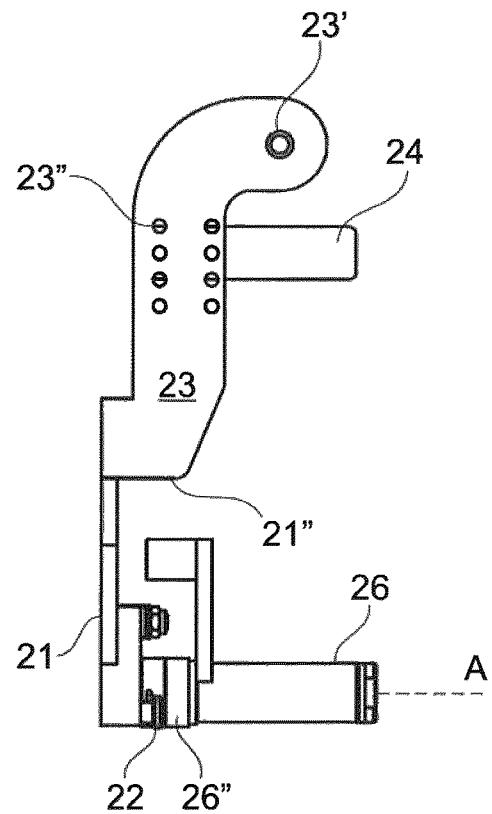
Fig. 2a
Fig. 2d
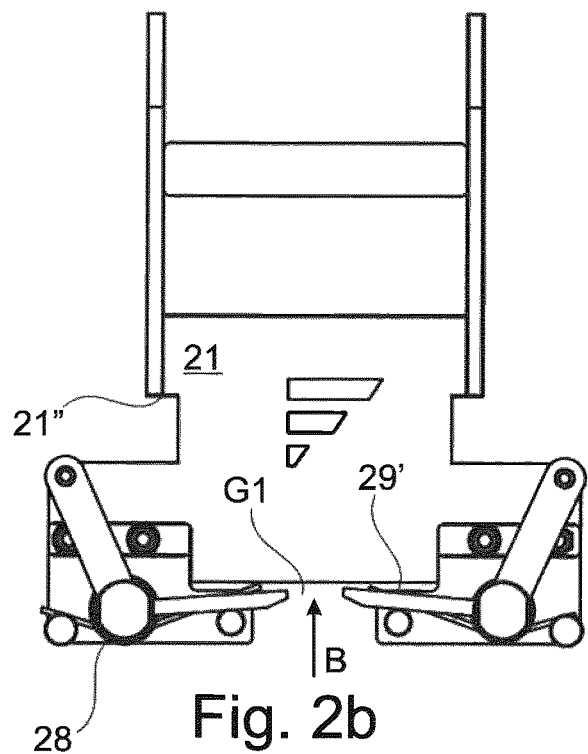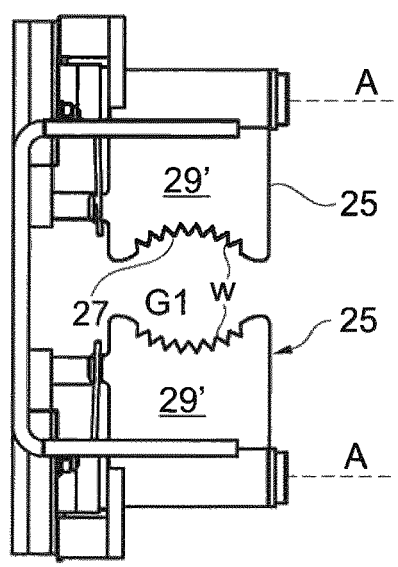
Fig. 2b
Fig. 2c

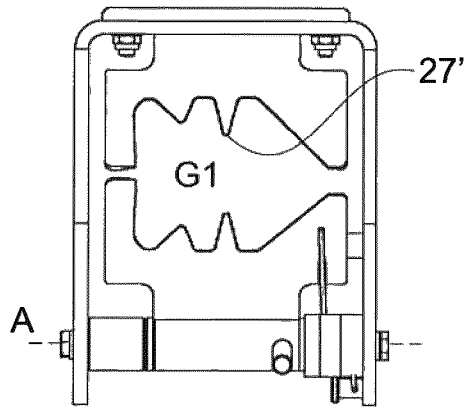
Fig. 2g(i)
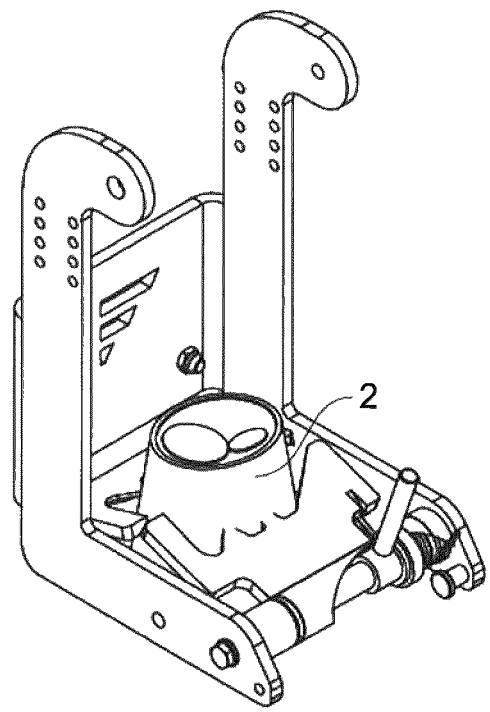
Fig. 2g(ii)
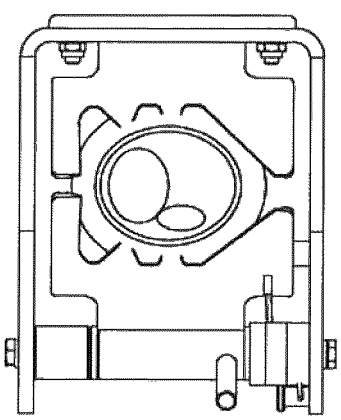
Fig. 2g(iii)
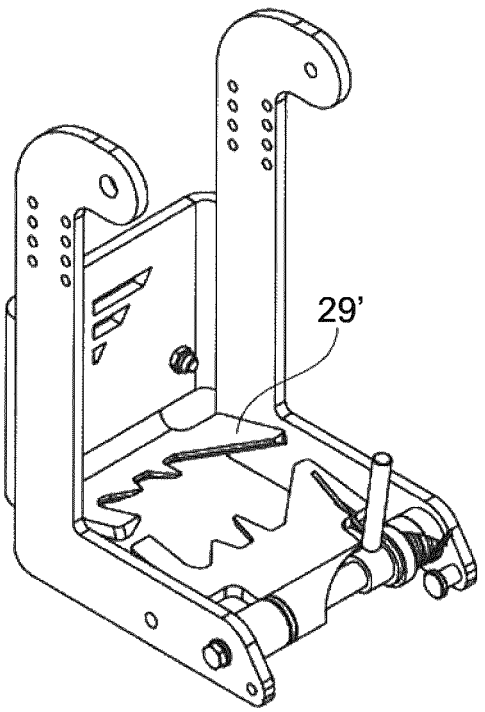
Fig. 2g(iv)

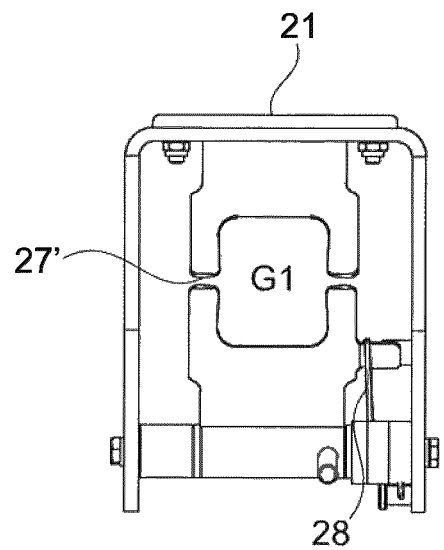
Fig. 2 h(i)
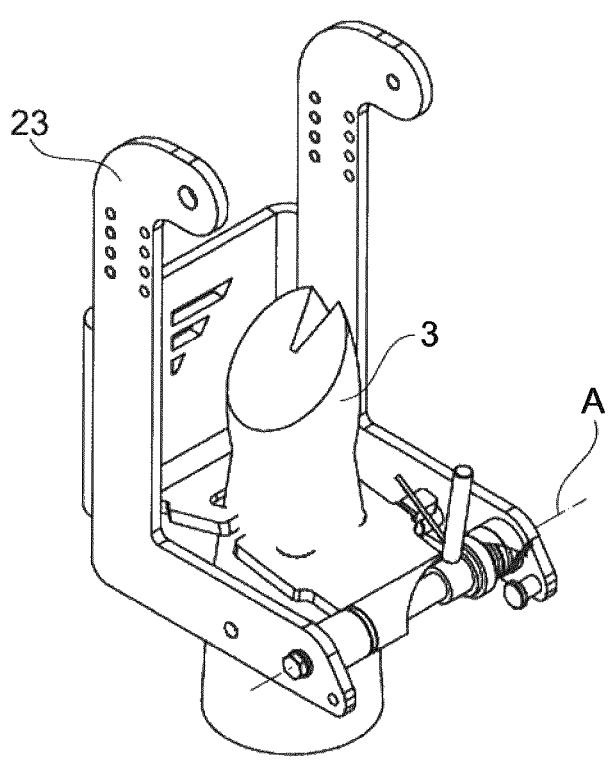
Fig. 2 h(ii)
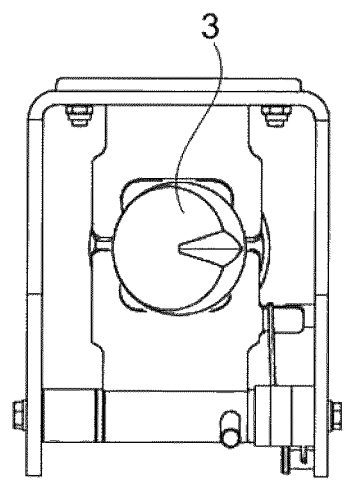
Fig. 2 h(iii)

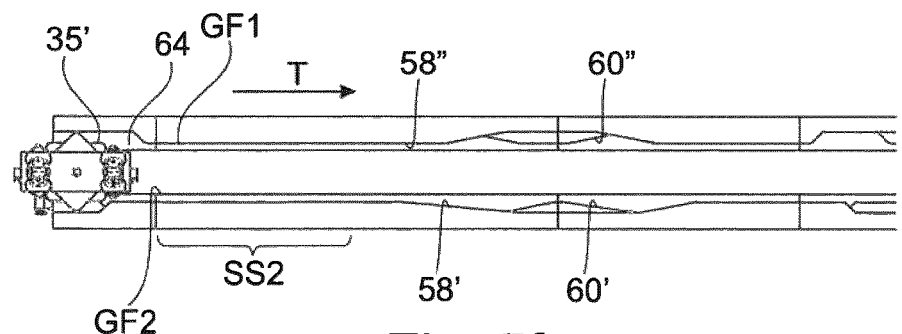
Fig. 5f
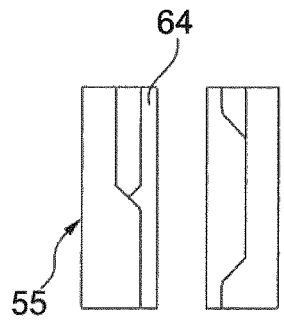
Fig. 5g
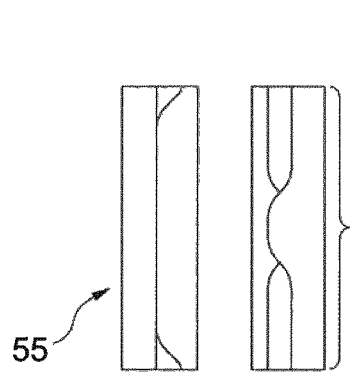
Fig. 5h
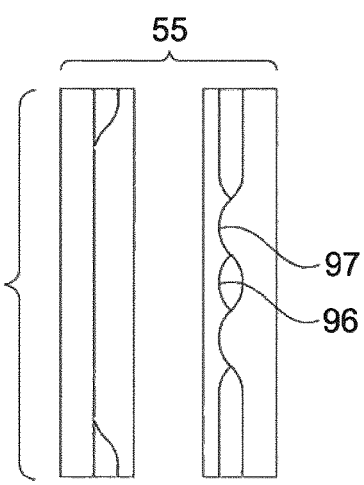
Fig. 5i
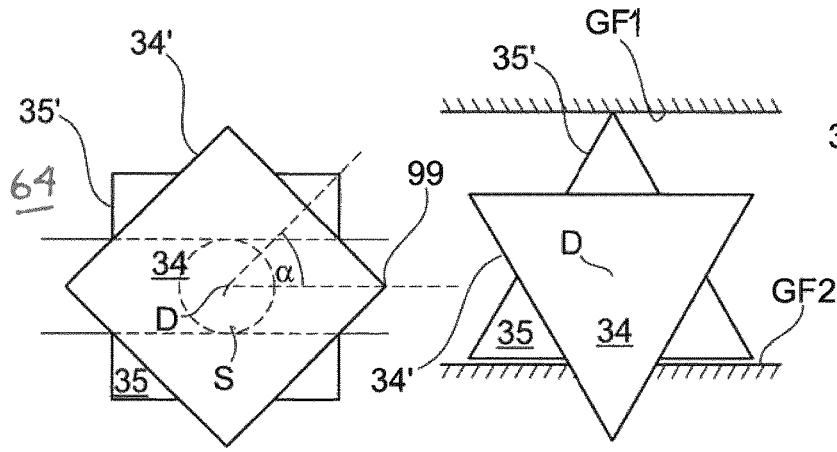
Fig. 5j
Fig. 5k
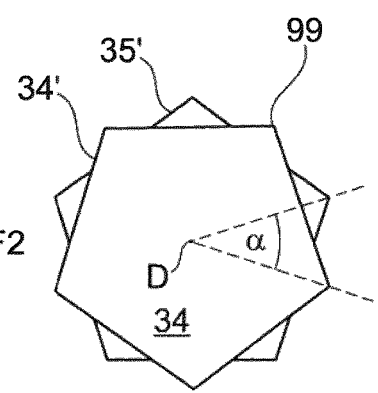
Fig. 5l

SLAUGHTERED PIG PART PROCESSING PLANT, A CLAMP STRUCTURE FOR RETAINING A SLAUGHTERED PIG PART, AND A METHOD OF RETAINING A SLAUGHTERED PIG PART BY A CLAMP STRUCTURE

This application is a national application out of Patent Cooperation Treaty Patent Application No. PCT/EP2020/056670, filed on Mar. 12, 2020, the entire contents of which are incorporated herein by reference.

This application claims under 35 U.S.C. § 119(a) the benefit of: 1) the filing date of Denmark Patent Application No. PA201970166, filed on Mar. 15, 2019, and 2) the filing date of Denmark Patent Application No. PA201970183, filed on Mar. 25, 2019, the entire contents of each of which are incorporated herein by reference.

BACKGROUND OF THE INVENTION

Field of the Invention

The present invention relates to a pig part processing plant, a pig part retaining assembly, and a method for securing pig parts to the pig part assembly.

Related Art

EP 1 658 774 discloses a plant. This plant has several limitations, among others in that the retaining assemblies for holding the pig parts are limited to holding pig parts within a very narrow range of size determined by the fixed distance between the opposite plate members that define a gap for receiving a portion of the pig part. In addition, the known plant requires the operator to shift between different positions for processing the sides and the front, respectively, of the pig part.

An object of the present invention is inter alia to provide an improved pig part processing plant and an improved pig part retaining assembly.

SUMMARY

In a first aspect of the invention, a plant is provided where pig part holding clamps have a carrier part with two jaws, each jaw having an edge oriented towards the edge of the other jaw, the edges defining between them a gap, the jaws having a first face and an opposite second face, at least one of the jaws being mounted to turn relative to said carrier part about an axis from a first position to second positions where the gap is opened up, wherein a force applied against the first face turns the jaw(s) from the first position, a biasing force, preferably provided by a respective spring, biasing the jaw(s) towards the first position at least when the clamp structures move away from the first station.

In a second aspect of the invention a pig part holding clamp is provided, having a carrier part with two jaws, each jaw having an edge oriented towards the edge of the other jaw, the edges defining between them a gap, the jaws having a first face and an opposite second face, at least one of the jaws being mounted to turn relative to said carrier part about an axis from a first position to second positions where the gap is opened up, wherein a force applied against the first face turns the jaw(s) from the first position, a biasing force, preferably provided by a respective spring, biasing the jaw(s) towards the first position.

In a third aspect of the invention, a method is provided for using the aforementioned clamps.

Preferred embodiments providing significant benefits in solving particular problems are defined in the dependent claims. In particular, guiding elements may be provided defining together with the couplings a rack and pinion structure, to allow for a progressive rotation of the clamp structures about a vertical axis as the couplings pass along a processing station.

A processing plant of the present invention may be defined eg. by the combination of slaughtered pig part processing stations of an existing processing plant with a replacement conveyor with clamps as defined herein, or by using clamps as defined herein replacing clamps used with an existing processing plant with a conveyor and slaughtered pig part processing stations.

DETAILED DESCRIPTION

The invention will now be explained in more detail below by reference to various embodiments.

Figure 1B:
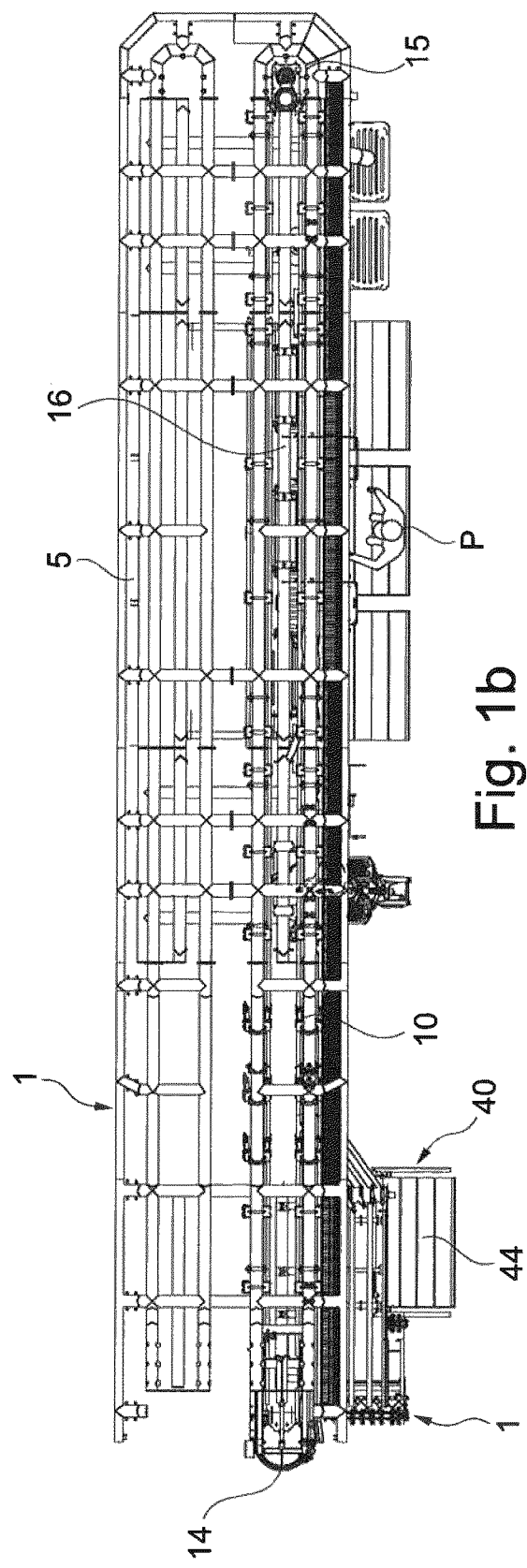
FIG. 1b is a top view of the plant of FIG. 1a, FIG. 1c is a perspective view of a first and second section of the plant of FIG. 1a, FIGS. 2a-d show a first embodiment of a clamp of the present invention, in perspective, front, top and side views, respectively, FIG. 2c showing a gap G1 viewed from above
Figure 1A:
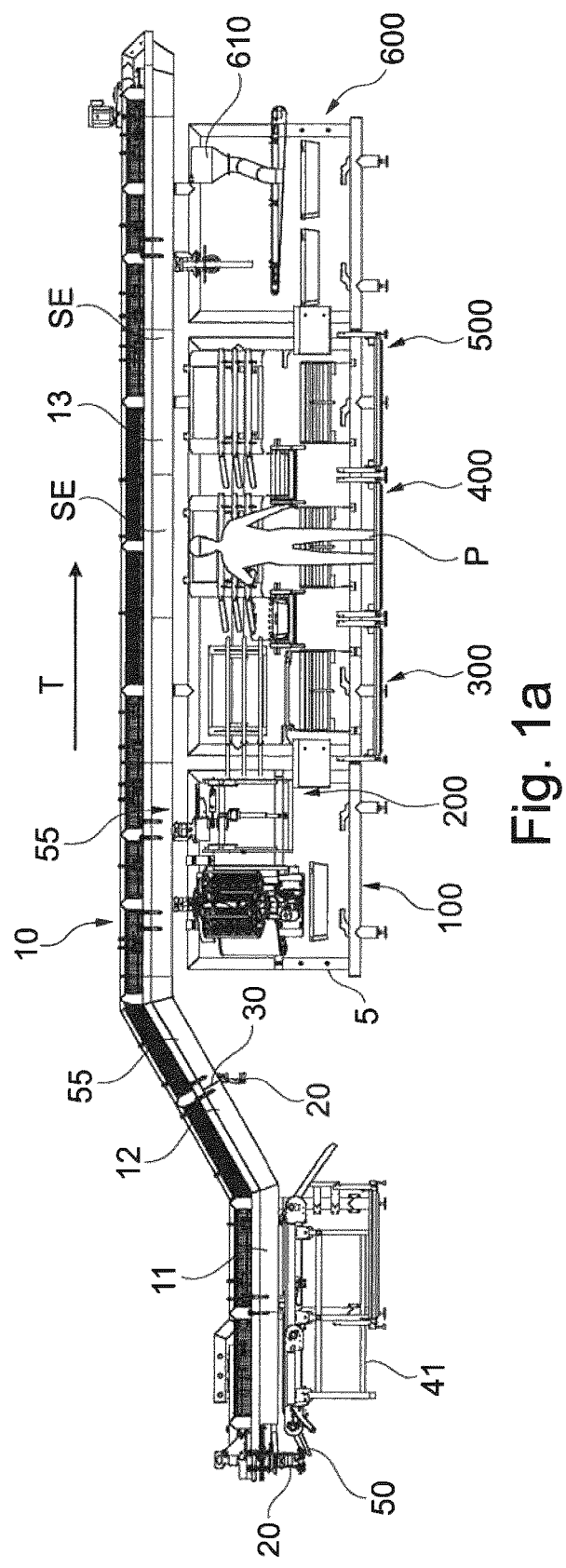
FIG. 1a is a side view of an embodiment of a slaughtered pig part processing plant, with a plurality of suspended clamps of the present invention.

FIG. 1a generally shows a side view of an embodiment of a slaughtered pig part processing plant 1 including an elongated frame 5 carrying a conveyor 10 that supports and advances a plurality of spaced apart pig part retaining assemblies referred to herein as clamp structures 20 or, for convenience, simply as "clamps".

Figure 7:
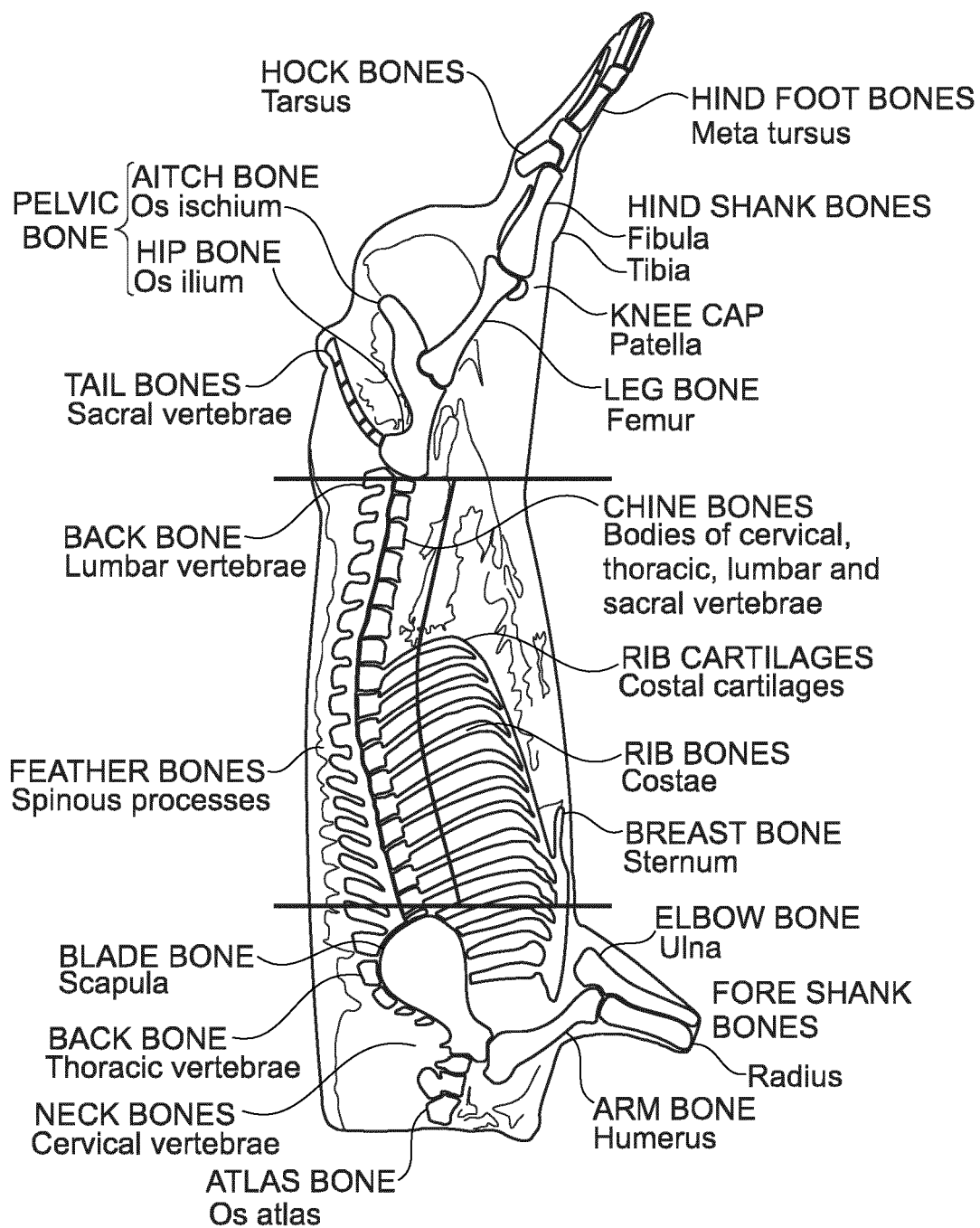
FIG. 7 is a general overview of the anatomy of a pig wherein either the upper third or the lower third thereof is processed using the processing plant and clamps of the invention.

Each clamp 20 is configured for holding a pig part, and the pig parts are advanced by the conveyor 10 in a general machine direction T from a first station 40, where a portion of the pig part is introduced automatically or manually between two jaws of the clamps 20, to a last station 600 where the bone of the processed pig part is removed automatically from the clamps 20. The pig part is normally a leg or shoulder part, such the hind shank with the hind foot or the fore shank, see FIG. 7.

Between the first station 40 and the last station 600 is a sequence of processing stations 100, 200, 300, 400, 500 for performing various cutting operations and for removing meat from the bone of the individual pig parts. In the shown embodiment the conveyor 10 of the plant 1 has a first section 11 extending at a relatively low level, and a second section 12 extending upwards to an overhead third section 13 next to which are the plurality of processing stations 100, 200, 300, 400, 500 as well as the last station 600. Normally, the conveyor 10 runs continuously, with pig parts 2 moving slowly past the processing stations as they are being processed.

As seen best in FIG. 1b, which is a top view of the plant of FIG. 1a, the conveyor 10 has a return part 16 returning the empty clamps 20 from the last station 600 to the first station 40 and extending between redirecting sections 14, 15. Preferably, the conveyor 10 is an endless structure, such as a chain, carrying the clamps 20 via couplings 30 and driven and guided by any conventional means, such as by rollers located at the redirecting sections 14, 15.

In one embodiment as shown in FIG. 1b, two independently operating processing plants 1 as described above may have their conveyors 10 positioned back to back and be operating with a respective one of the different types of clamps 20 described below, one plant 1 processing hind shanks and the other plant 1 processing fore shanks.

Figure 1C:
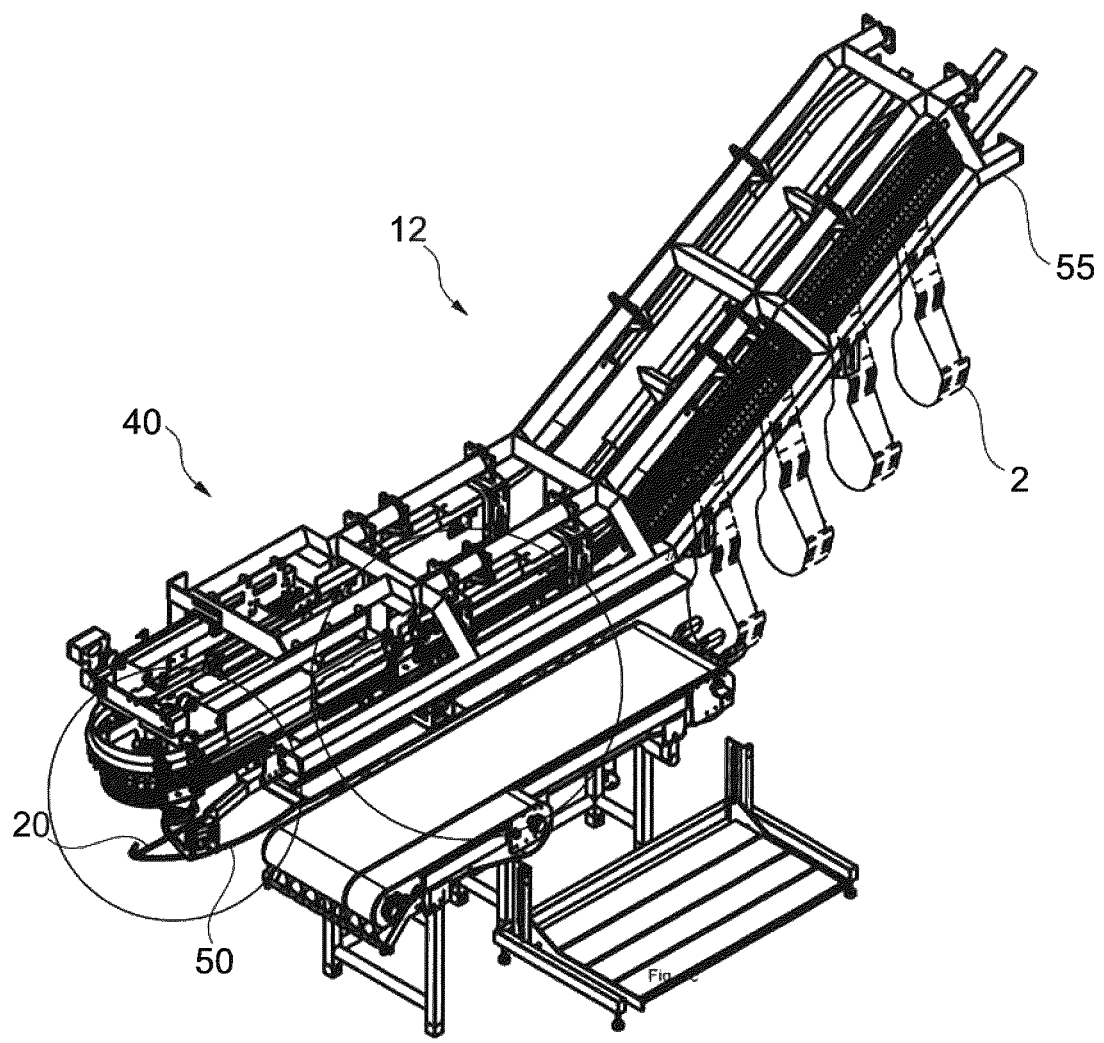
FIGS. 5a-1 show details of second guiding elements and of the lower and upper bodies of the coupling.

FIG. 1c is a perspective view of the first station 40, showing also a suspended pig part 2 being advanced from the first station 40 along the second conveyor section 12, held between the jaws of a clamp 20.

In the following, the clamps 20, a coupling 30 for coupling each clamp 20 to the conveyor 10, the first station 40, means for rotating the clamps 20 relative to the conveyor frame 5 about a generally vertical axis, and the last station 600 will be discussed.

FIGS. 2a-2d show a first embodiment of a clamp 10 of the present invention, which clamp 10 may find use in the plant of FIG. 1a or in any other slaughtered pig part processing plant of the general type that includes a conveyor frame with a conveyor for supporting a plurality of spaced apart pig part retaining assemblies and where the conveyor advances the pig parts in a machine direction from one station for introducing pig parts into the retaining assemblies, to a last station where the bones of the processed pig parts leave the retaining assemblies.

The clamps 20 of the invention are normally of a food compatible material, such as stainless steel or a synthetic material, and generally includes a connecting structure or carrier part 21 carrying two jaws 25, at least one being pivotable. The jaws 25 each have an elongated gripping edge 27 that preferably is serrated as shown, or sharpened, as well as a first face 29 and an opposite second face 29'. The jaws 25 are mounted to the carrier part 21 with their gripping edges 27 facing one another.

In the embodiment of FIGS. 2a-2d the two jaws 25 are each mounted for turning relative to the carrier part 21 about a respective axis A, from the shown first position resting against an abutment 21', in which first position the width w of a gap G1 between the opposite gripping edges 27 is relatively small, to second positions where gap G1 is opened up and the aforementioned width w becomes progressively larger. The maximum turning of the jaws 25 away from the first position is preferably limited by respective abutments 21".

In the shown embodiment, the general contour of the gap G1, when viewed from above as in FIG. 2c, is oval; generally, the shape of the edges 27 is designed such that the contour of the gap G1 follows the cross-sectional periphery or outline of the inserted portion 3 of the pig part 2, see FIGS. 2f, 2g(ii) and 2h(ii), with teeth 27' arranged along the edges 27 biting into the pig part as explained below. The jaws 25 are normally formed from flat metallic plates and the jaw 25 edges 27 may be defined by replaceable parts.

Turning of the jaw(s) 25 from the first position is effected by applying a force against their first face 29, in the direction indicated by the arrow B in FIG. 2b, against a biasing force, such as that provided by a respective spring 28, biasing the respective jaw 25 towards the shown first position.

In the embodiment of FIGS. 2a-2d the carrier part 21 defines a rear plate and has two outwardly projecting pins 22 onto each of which a tubular structure 26, preferably open only at one end 26', connected to the jaws 25 opposite the gripping edge 27 thereof, is mounted. The spring 28, preferably being a wire wound around the respective pin 22 inside the tubular structure 26, is connected with the pin 22 or the rear plate 21 and with the jaw 25, to provide the aforementioned biasing force.

Two opposite, upright flanges 23 are generally mounted to the carrier part 21 and preferably have apertures 23" for variable positioning of a back-stop plate 24 for the reason explained below, as well as a respective aperture 23' or other structure for connecting the clamp 20 to a respective coupling 30. This connection is such as to allow the clamp 20 to be turned about a first axis C relative to the coupling 30 from a position wherein the first faces 29 are oriented more or less downwards as in FIG. 4d, to a position wherein the first faces 29 extend generally vertically, as will be the case at the first station 40, cf. FIGS. 4a-b, where the jaws 25 are in their first position, the clamp 20 being ready to receive a portion of a pig part 2 through applying a generally horizontal force in direction B against the faces 29.

Figure 2E:
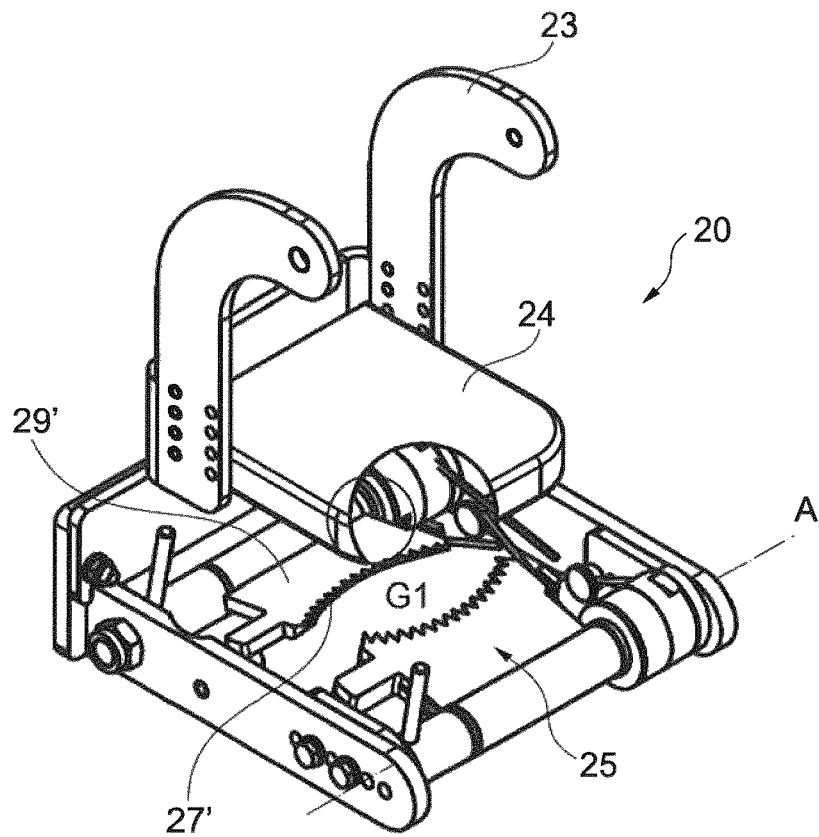
FIGS. 2e-f show another embodiment of the clamp of the present invention in a perspective view, without and with a pig part, FIGS. 2g(i-iv) and 2h(i-iii) show a third and a fourth embodiment, respectively, of the clamp of the present invention.
Figure 2F:
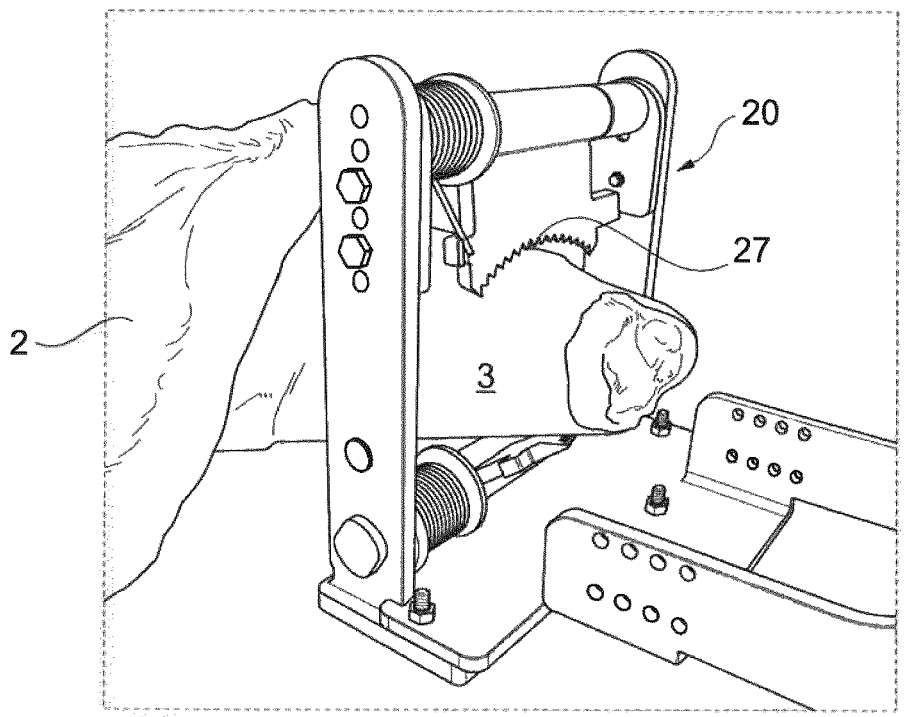

FIG. 2e shows a second embodiment of the aforementioned clamp 20 of the invention, of generally larger size than the one of FIGS. 2a-2d, for holding on to a relatively thicker pig part 2, such as portion 3 of a pig fore shank from which the foot has been previously removed, see FIG. 2f.

Figure 3A:
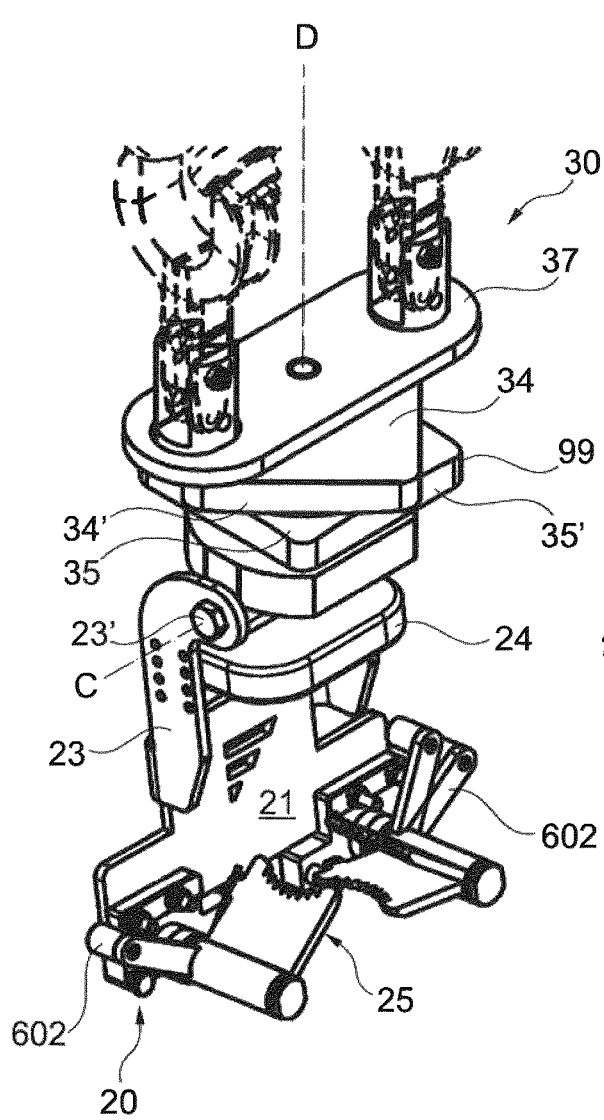
FIGS. 3a-b show an embodiment of the clamp of the invention connected to a coupling.
Figure 3B:
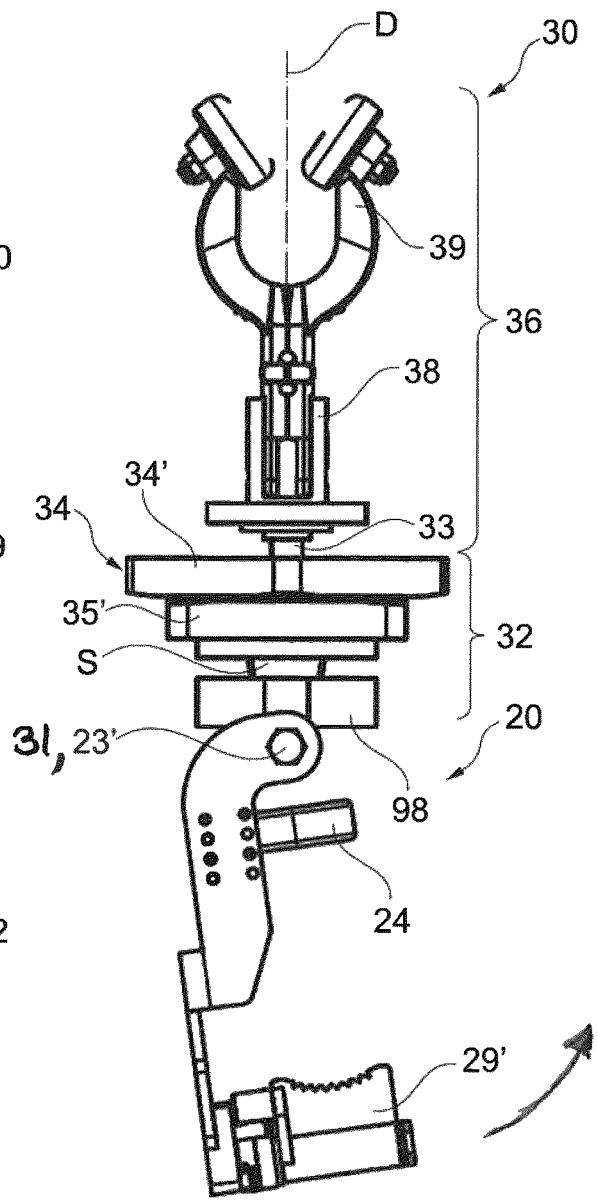

Turning now to FIGS. 3a and 3b an embodiment of a coupling 30 connecting the clamps 20 of the invention to the conveyor 10 will be discussed in further details; FIGS. 3a and 3b show the coupling 30 used in connection with the first embodiment of the clamps 20 but it may generally used with any of the clamp 20 embodiments disclosed herein.

FIGS. 3a and 3b are perspective and side views, respectively, of the clamp 20 pivotally mounted to a coupling 30 to allow for a rotation of the clamp 20 about the first axis C relative to the coupling 30. Preferably, this may be by a pin 31 attached to a lower structural part 32 of the coupling 30 and received by the aperture 23' of the flange 23 of the clamp 20. In this manner the clamp 20 may turn by an angle, such as 90° in the direction indicated by the arrow in FIG. 3b, to an orientation where the lower faces 29 are oriented generally vertically, for introducing a pig part 2 into the clamp 20 at the first station 40 in the manner described later below.

The lower structural part 32 on its side is rotatably mounted to an upper structural part 36 of the coupling 30 so as to allow for a turning of the lower structural part 32 relative to the upper structural part 36 about a second axis D which when processing the pig parts 2 is normally vertical and which is generally perpendicular to the first axis C. To allow for this turning movement, to the lower structural part 32 of the coupling 30 is mounted a pin 33 which is received by the upper structural part 36.

The upper structural part 36 on its side includes a plate-like body 37 receiving the pin 33 in a manner allowing mutual rotation and having a number of sockets 38 to each of which is connected a bracket 39 engaging with the conveyor 10, which may be a chain. Relative turning about a generally horizontal axis between the bracket 39 and the sockets 38 may be provided for.

As may be understood, the first axis C and the second axis D normally extend generally horizontally and vertically, respectively, when the clamps 20 move in the machine direction T shown in FIG. 1a along the first section 11 and the third section 13 thereof.

The lower structural part 32 includes a lower body 35 immovably fixed to, or integral with, an upper body 34, which lower body 35 has a number of edges 35', referred to in the following as "second edges", that preferably are straight as shown. The lower body 35 also has a downward extension including the pin 31 extending through aperture 23' for connecting the lower structural part 32 with the clamp 20. The downward extension includes a circular stem portion S located above the latter pin 31.

The upper body 34 of the lower structural part 32 also has a number of edges 34', referred to in the following as "first edges", that preferably are straight and that correspond in number to the number of the second edges 35'. The second edges 35' are arranged at an angular offset a relative to the first edges 34' when viewed from above, see sectional views of FIGS. 5j-l. Preferably, for each of the upper and lower body 34, 35 the edges 34', 35' thereof meet at rounded or sharp corners 99, with the upper and lower body 34, 35 having the same contour and showing a rotational symmetry. The contour of the upper and lower bodies 34, 35 is generally that of an n-sided regular polygon, such as of an equilateral triangle, a square as in the embodiment of FIG. 3a-b, or a regular pentagon, the angular offset a being 60°, 45° or 36°, respectively, see also FIG. 5j-l.

As explained below, the plant 1 is preferably configured to provide for a turning of the clamps 20 about the vertical axis D as the clamps 20 move past the processing stations 100, 200, 300, 400, 500, such as by an angle of +/−90° or more, by the aforementioned edges 34', 35' and/or corners 99 of the upper and lower bodies 34, 35 alternatingly engaging dedicated second guiding elements 55 of the plant 1.

As seen in FIG. 1a the plant 1 comprises first and second guiding elements 50, 55 that extend below and along respective portions of the first and third sections 11, 13 of the conveyor 10, and possibly also along the shown second portion 12, and serve to orient the clamps 20 as required, by giving rise to a turning of the clamps 20 about the first and second axes C and D, respectively, as the clamps 20 are advanced by the conveyor 10. The second guiding elements 55 that act on the lower structural part 32 for turning about axis D will be described later herein.

Figure 4A:
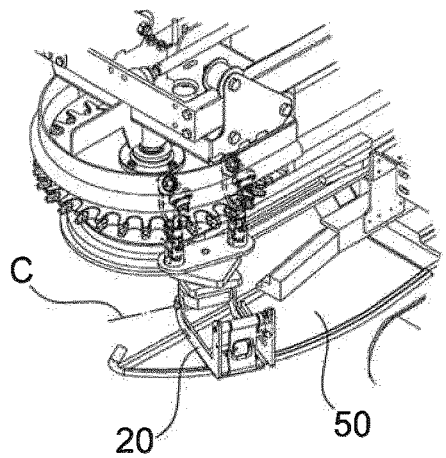
FIGS. 4a-b show details of a first station of the plant, with a clamp of the invention turned to a horizontal position sliding on first guiding elements.

Before reaching the first station 40 the empty clamps 20 have been appropriately turned about the aforementioned vertical axis D by the second guiding elements 55, that are positioned along the return part 16 of the conveyor 10, interacting with the lower structural part 32, and are by action of the first guiding elements 50 presented now as shown in FIG. 4a to an operator standing alongside the conveyor 10 next to a loading table 44 of the first station 40, with the first axis C extending essentially horizontal and parallel with the machine direction T.

The first guiding elements 50 include a fixed elongated ramp-like guiding face, seen best in FIG. 4a, extending at a gradually increasing angle to the vertical and configured for turning, by physical contact with the carrier part 21, the moving clamp 20 about the axis C from the orientation shown generally in FIG. 3b to the orientation shown in FIG. 4a with the first jaw faces 29 extending generally vertically, facing the operator standing in front of the table 44. The clamp 20 is preferably held in this configuration by the elongated first guiding element 50, on top of an essentially horizontal face portion of the first guiding elements 50, on moving through the first station 40 along the table 44.

Figure 4B:
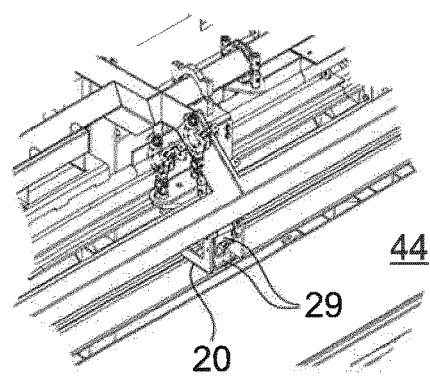
Figure 4C:
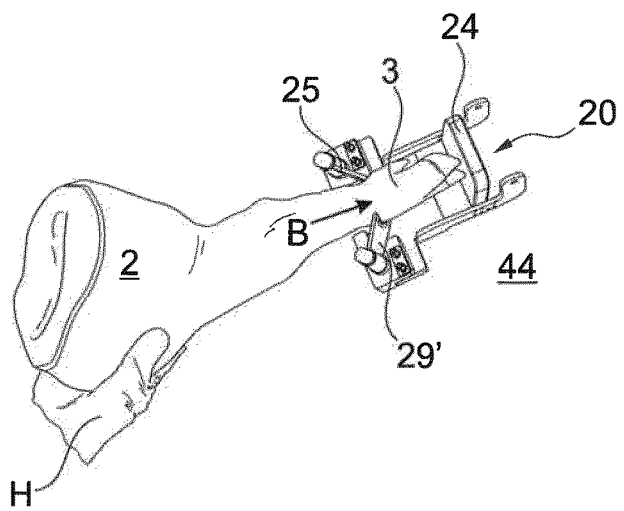
FIGS. 4c-d show the clamp holding a pig part, in the position of FIG. 4b and hanging freely, respectively.

FIG. 4c is a perspective view showing a pig part 2 pushed or loaded by an operator into the gap G1 between the jaws 25, the pig part 2 still supported by the table 44 of the first processing station 40. For this, turning the jaws 25 from their first position has been effected by the operator holding the pig part 2 with his hand H and forcing the tip of the pig part 2, shown here as the pig hind leg 3, against the respective first face 29 of the two jaws 25, applying thereby a force in direction B. Proper dimensioning will ensure that for any conventional slaughtered pig the tip 3 of the pig part 2 affects a turning movement of the jaw(s) 25 against the spring 28 from the first position of the jaw(s) 25. Moreover, by designing the gap G1 such that, as shown in FIG. 2c, the general contour of the gap G1 is somehow oval or with any similar appropriate shape it is ensured that the opposed edges 27 of the jaws 25 will bite into the pig part 2 along a substantial part of the periphery thereof. This will prevent or restrict free removal of the pig part 2 from the clamp 20, until the jaws 25 are manually or automatically forced to turn against the biasing force of the spring 28, which will typically happen at the last station 600 as explained further below.

As seen in FIG. 4c, the pig part 2 is inserted between the jaws 25 until the toe or tip 3 thereof contacts the back-stop plate 24. Positioning the back-stop plate 24 relative to the position of the jaws 25 by the flange 23 apertures 23" or other suitable connecting means allows for the maximum insertion of the foot part 3 to be adjusted, depending of the pig size.

Figure 4D:
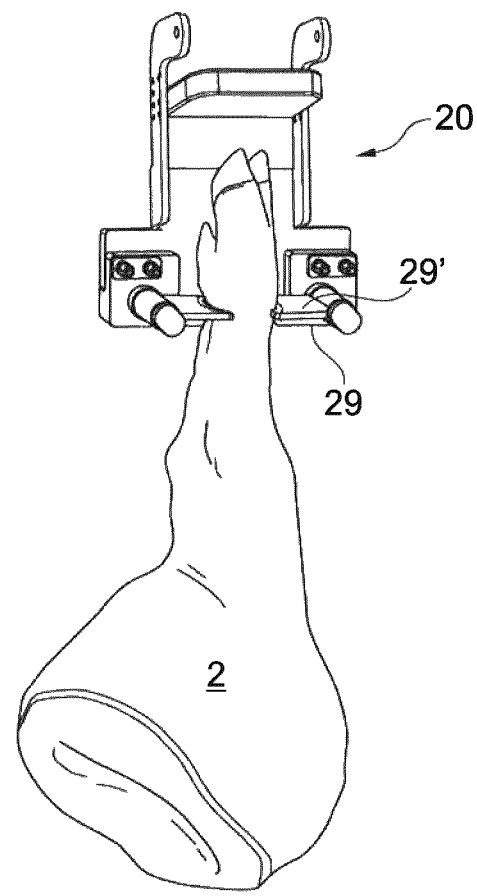

As the clamp 20 with the pig part 2 held by the action of the spring 28, moves further forward in direction T to leave the first guiding elements 50 the clamp 20 is no longer held in the turned position shown in FIG. 4b. Consequently, the clamp 20 will turn back about the first axis C, normally by the action of gravity alone, to a position as shown in FIG. 4d with the first face 29 of the jaws 25 oriented again generally downwards, carrying the pig part 2 up along the second section 12 of the conveyor, see FIG. 1c. At this time the weight of the pig part 3 will cause a further biting of the opposite edges 27 of the jaws 25 into the meat of the pig part 2, allowing the jaws 25 to turn further towards their first position, effectively holding on to the pig part 2 with a stronger force.

It is realised that a spring 28 as discussed above may not be necessary in all instances since the pull by gravity on the pig part 2 suspended from the clamp 20 will provide the same bite; for that case means (not shown) may be provided at the first station 40 for ensuring that the jaws 25 do not turn freely, but with some resistance by an external force, about the respective axis A on insertion of the pig part 2.

It will also be understood that the biting of the jaws 25 into the pig part 2 may also be achieved in embodiments where one of the jaws 25 is fixed while only the opposite jaw 25 is pivotally arranged to turn against the action of a spring 28. Such embodiments are shown in FIGS. 2g(i-iv) and 2h(i-iii), with and without a pig part held between the jaws 25. As shown, one of the jaws 25 is welded or otherwise fixedly connected to the carrier part 21, extending at a slight angle to the horizontal. FIG. 2g(iii) shows the edges 27 being preferably sharpened, and provided with a serration defined only by a few projecting teeth or prongs 27' that extend into the pig part 2 flesh between the bones of the fore or hind leg. Alternatively, for holding a pig part 2 including a foot 3 an embodiment as shown in FIG. 2h(i-iii) may be preferred, wherein the grip is more even around the foot 3 to reduce product damage.

As shown in FIG. 1a, extending below the second 12 and third section 13 of the conveyor 10 and along therewith is a track structure SE with the aforementioned second guiding elements 55, normally being defined by a sequence of first type groups SS1, each with two subset of guiding faces for effecting a predefined pattern of rotations about the upright axis D of the clamps 20, and second type groups SS2 each including a guiding face for preventing rotation about the axis D of the clamps 20. Such groups of the track structure SE are shown cut away from adjacent groups for illustrative purposes in FIG. 5a, with a coupling 30 advanced by the conveyor 10 moving along one first type group SS1 before entering a rotation preventing downstream second type group identified as SS2 and then a downstream, first type group SS1 for bringing about a further rotation about the vertical axis D.

Figure 5A:
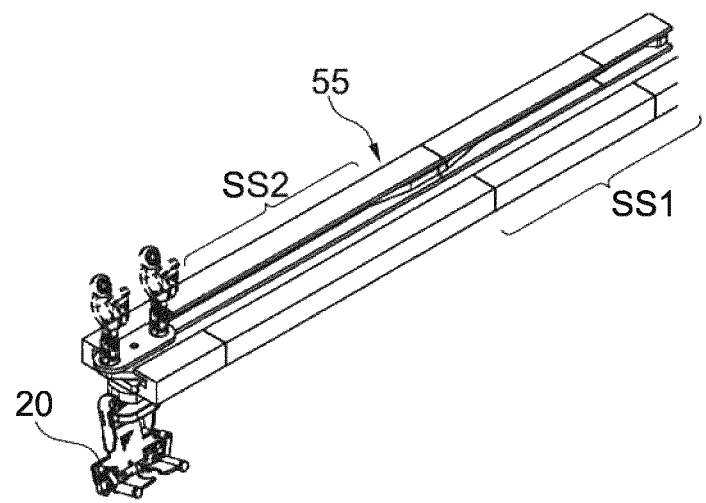
Figure 5B:
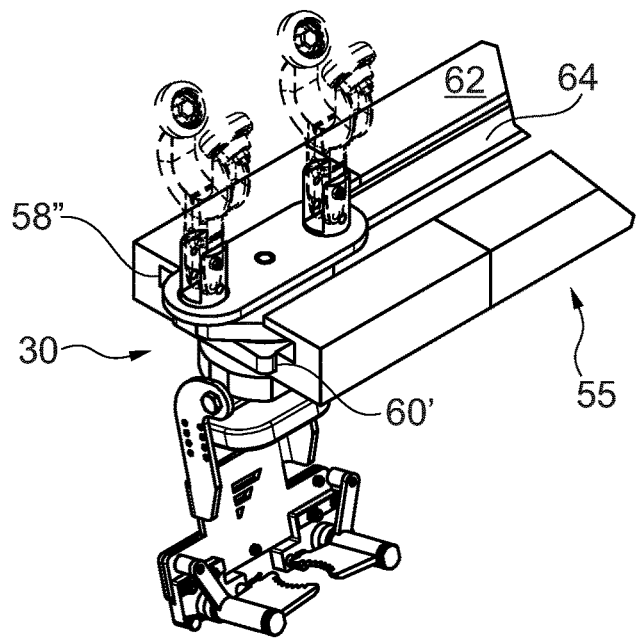
Figure 5C:
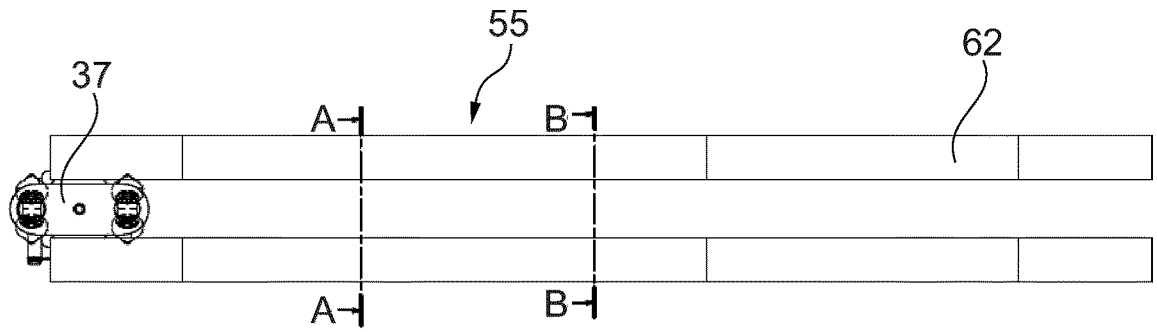
Figures 5D, 5E:
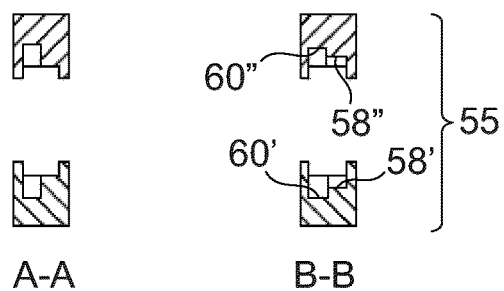

As seen in FIG. 5b which is an enlarged perspective cross-sectional view of two groups of guiding faces of FIG. 5a, and in FIG. 5e, two subsets of guiding faces generally may comprise pairs of opposite first elongated guiding faces 58', 58" at one vertical level for contacting the aforementioned first edges 34' of the lower structural part 32 and pairs of opposite second elongated guiding faces 60', 60" at lower vertical level for contacting the aforementioned second edges 35'. The pairs of first and second guiding faces 58', 58", 60', 60" are arranged at a respective level, corresponding to the respective level below the conveyor 10 at which the first and second edges 34', 35' are advanced in the machine direction T, and serve to, upon sliding engagement with a corresponding edge 34', 35', rotate the lower structural part 32 with the clamp 20 relative to the upper structural part 36 about the vertical second axis D. Such a rotation by 90° may preferably take place as the clamp 20 leaves the first section 10, so that the horizontal first axis C then extends generally perpendicular to the machine direction T and the pig part 2 faces the direction of movement T as it moves along the second section 12, see FIG. 1c.

A rotation about the vertical second axis D may in particular be desirable for processing different surface portions of the suspended pig parts 2 at a given processing station 100, 200, 300, 400, 500, by guiding faces of selected configuration being located at the processing station. The lengthwise configuration of the guiding faces of one group SS1 may then vary along the extension of the processing station in the machine direction T, to rotate the pig part 2 about the vertical axis D as it passes through the processing station, see FIGS. 5h and 5i. FIG. 5i shows the first and second guiding faces that act together with the lower structural part 32 to provide a rack and pinion structure, with spaced apart upper teeth or rounded projections 97 and lower teeth or rounded projections 96 defining in part the respective first and second guiding faces 58', 60' along one side of the group SS1, at different vertical levels.

The subelement configuration shown in FIG. 5i allows for a progressive rotation of the pig part 2 of four times 45° as the pinion defined by the lower structural part 32 with tooth-like corners 99 passes along the processing station, thereby allowing processing of different surface portions of the pig part; as will be understood the upper and lower bodies 34, 35 alternatingly engage a corresponding subset of guiding faces to progressively bring about the rotation of the lower structural part 32 up to a predetermined angle of rotation when the coupling 30 is advanced in the machine direction T past the two subsets defining the first type group SS1.

As seen best in FIG. 5f the opposite guiding faces 58', 58", 60', 60" of the pairs defining a subset may alternatingly converge and diverge in the machine direction T, to control and initiate the rotation about the vertical axis D by sliding contact with the edges 34', 35' and/or corners 99 of the upper and lower body 34, 35. A base portion 64 of the track structure SE may be provided having an elongated track receiving the circular stem portion S of the lower structural part 32 located below the lower body 35, for providing sideways support for the coupling 30, see FIG. 5j. A top cover plate 62 not shown in FIG. 5f may be provided with a similar elongated track, for the same purpose.

As will be understood from the above, normally one guiding face 58', 60' configuration of one or the other of the aforementioned subsets will contact one of the corners 99 of the lower structural part 32 for initiating and temporarily maintaining a clockwise or anti-clockwise turning movement about the vertical axis D as the coupling 30 is advanced in the machine direction T, and an opposite guiding face 58", 60" configuration arranged downstream may then later contact another one of the corners of the lower structural part 32, for initiating and temporarily maintaining a further clockwise or anti-clockwise turning movement about the vertical axis D as the coupling 30 is advanced further in the machine direction T along a group SS1.

Preferably, the second guiding elements 55 are configured such that after completion of rotation of the lower structural part 32 about the vertical axis D by a desired angle some of the guiding faces will prevent any further, undesired rotation about the vertical axis D. This may be by the contact shown in FIG. 5b of two directly opposed upper or lower body 34, 35 edges 34', 35', as in the case of upper and lower bodies 34, 35 with a square contour, with linear portions of the guiding faces oriented parallel with the machine direction T and defining the aforementioned second group SS2, or by contact of one straight edge and an opposite corner 99, which may be the case where the upper and lower bodies have a triangular or pentagon outline, with such linear portions GF1, GF2 oriented parallel with the machine direction T, of the guiding faces, see FIGS. 5f and 5k.

Figure 6:
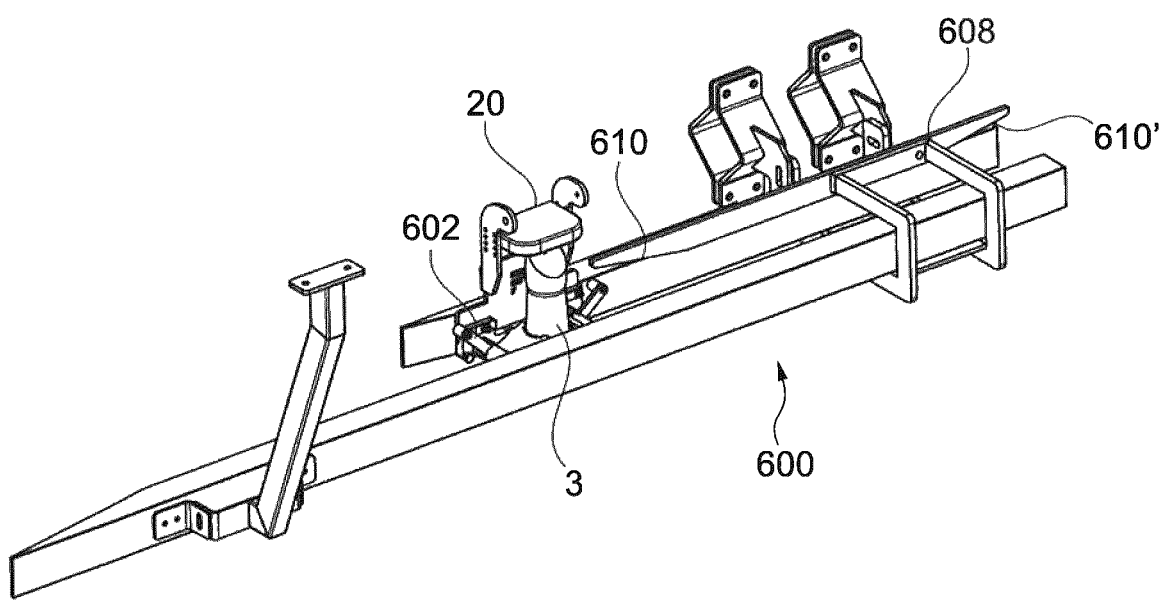
FIG. 6 is a perspective view of a last station of the processing plant.

In FIG. 6 is shown the aforementioned last station 600 of the plant 1, wherein an activating element 610 is arranged on an elongated structure 608, to mechanically engage an arm 602 mounted onto each of the jaws 25 of the clamps 20 as the clamps 20 move along the overhead, third conveyor section 13. The pig part at this point has had most or all meat removed at the processing stations 100, 200, 300, 400, 500, and so the remaining portion still held by the clamp generally comprises only the bone, such as the hock bones or the fore shank bones shown in FIG. 7, depending on whether the situation shown in FIG. 2f or in FIG. 4c applies.

On the respective arm 602 contacting the activating element 610, which is the shown embodiment is constituted by an inclined, generally downwardly oriented face in direction T, the jaws 25 are first turned about their respective axis A against the force of the springs 28, to widen the gap G1, thereby allowing the pig part to be dropped from the clamp 20, into a collecting bin 601 as shown in FIG. 1a. A further downwardly oriented face 610' gradually releases engagement with the arms 602, thereby returning the jaws 25 to their first position shown in FIGS. 2a-d, whereafter the clamps 20 are returned to the first station 40, ready to receive another pig part 2.

It is noted that according to the invention the principles relating to the elongated second guiding elements 55 discussed herein may be used for the described reorienting of any type of pig part retaining assembly, such as the one disclosed in FIG. 22D of EP10803166.7, when fitted with a correspondingly configured structural part 32.

The invention claimed is:

1. A slaughtered pig part processing plant comprising:
a plurality of pig part processing stations; and
a conveyor supporting, via respective couplings, spaced apart clamp structures, said conveyor advancing said couplings with a respective one of said clamp structures for each of said couplings in a machine direction (T) from a first station for introducing a pig part between jaws of one of said clamp structures, towards a last station for removing a bone of said pig part from said one of said clamp structures;
wherein said clamp structures each comprising a carrier part carrying a first jaw and a second jaw, wherein said first jaw comprises a first edge oriented towards a second edge of said second jaw, said first edge and said second edge defining between them a gap (G1), said first jaw and said second jaw each comprising a first face and an opposite second face;
wherein said first jaw is being mounted to turn relative to said carrier part about an axis (A) from a first position to a second position where said gap (G1) is opened up; and
wherein a force applied against said first face of said first jaw turns said first jaw from said first position, a biasing force, biasing said first jaw towards said first position at least when said clamp structures move away from said first station.

2. The slaughtered pig part processing plant of claim 1, said first edge and said second edge each being serrated and/or sharpened.

3. The slaughtered pig part processing plant according to claim 1, wherein said first jaw and said second jaw are mounted to turn about said axis (A) and a second axis, respectively, said axis (A) and said second axis preferably being parallel with each other.

4. The slaughtered pig part processing plant according to claim 1, wherein said first edge comprising prongs for extending in between bones of a slaughtered pig fore or hind leg.

5. The slaughtered pig part processing plant according to claim 1, said carrier part comprising two projecting pins, said first jaw comprising a tubular structure open only at one end and arranged opposite said first edge of said second jaw, said tubular structure pivotally receiving or received by one of said two projecting pins to allow for turning about said axis (A), a spring for providing said biasing force being connected with said one of said two projecting pins or with said carrier part and with said first jaw.

6. The slaughtered pig part processing plant according to claim 1, said clamp structures comprising a back-stop for limiting movement of said pig part when introduced at said first station, said second face of said first jaw and said second face of said second jaw facing said back-stop.

7. The slaughtered pig part processing plant according to claim 1, wherein said clamp structures assuming at said first station a position wherein said first face is oriented generally vertically, for said force to be applied in a generally horizontal direction (B) against said first face.

8. The slaughtered pig part processing plant according to claim 1, wherein said clamp structures being connected to said conveyor so as to allow for a turning movement of said clamp structures about a first, generally horizontal axis (C); and
wherein said processing plant comprising first guiding elements for engagement with said clamp structures or said couplings when said clamp structures or said couplings are advanced in said machine direction (T) to said first station, for bringing about said turning movement about said first axis (C).

9. The slaughtered pig part processing plant according to claim 1;
wherein said clamp structures being connected to said conveyor so as to allow for a turning movement of said clamp structures about an upright axis (D); and
wherein said processing plant comprising second guiding elements arranged downstream said first station and before a subsequent processing station, for engaging said clamp structures or said couplings as said clamp structures of said couplings are advanced in said machine direction (T) from said first station, for bringing about said turning movement about said vertical axis (D).

10. The slaughtered pig part processing plant according to claim 1, said clamp structures comprising a back-stop for limiting movement of said pig part when introduced at said first station, said second face of said first jaw and said second face of said second jaw facing said back-stop, said clamp structures each comprising two opposite flanges connected to said carrier part and having apertures for a positioning of said back-stop relative to said second face of said first jaw and said second face of said second jaw.

11. A clamp structure for retaining a slaughtered pig part to be advanced by a conveyor in a slaughtered pig part processing plant, said clamp structure comprising:
a carrier part carrying a first jaw and a second jaw, wherein said first jaw comprising a first pig part gripping edge oriented towards a second pig part gripping edge of said second jaw, said first pig part gripping edge and said second pig part gripping edge defining between them a gap (G1), said first jaw comprising a first face and an opposite second face;
wherein said first jaw being mounted to turn relative to said carrier part about an axis (A) from a first position to second positions where said gap (G1) is opened up, wherein moving said pig part (2) against said first face turns said first jaw from said first position, a biasing force provided by a respective spring, biasing said first jaw towards said first position.

12. The clamp structure of claim 11, wherein said first pig part gripping edge and said second pig part gripping edge being serrated and/or sharpened.

13. The clamp structure according to claim 11, wherein said first jaw and said second jaw are each mounted to turn relative to said carrier part about said axis (A) and a second axis, respectively.

14. The clamp structure according to claim 11, wherein said first pig part gripping edge comprising prongs for extending in between bones of a slaughtered pig fore or hind leg.

15. The clamp structure according to claim 11, comprising a back-stop plate for said pig part, said second face oriented towards said back-stop plate.

16. The clamp structure according to claim 11, comprising a back-stop plate for said pig part, said second face oriented towards said back-stop plate, said clamp structure comprising two opposite flanges connected to said carrier part and having apertures for a positioning of said back-stop plate.

17. A method of operating a slaughtered pig part processing plant comprising:
- a plurality of pig part processing stations; and
- a conveyor supporting, via respective couplings, spaced apart clamp structures, said conveyor advancing said couplings with a respective one of said clamp structures for each of said couplings in a machine direction (T) from a first station for introducing a pig part between a first jaw and a second jaw of said one of said clamp structures, towards a last station for removing a bone of said pig part from said one of said clamp structures;
- wherein said one of said clamp structures comprises a carrier part carrying said first jaw and said second jaw, said first jaw comprising a first edge oriented towards a second edge of said second jaw, said first edge and said second edge defining between them a gap (G1);
- wherein said first jaw comprises a first face and an opposite second face;
- wherein said first jaw being mounted to turn relative to said carrier part about an axis (A) from a first position to a second position where said gap (G1) is opened up, wherein a force applied against said first face turns said first jaw from said first position, a biasing force biasing said first jaw towards said first position at least when said one of said clamp structures move away from said first station;

said method comprising:
- arranging said one of said clamp structures with said first face oriented vertically or essentially vertically at said first station (40);
- moving said pig part against said first face to open said gap (G1) by a portion of said pig part turning said first jaw about an axis (A);
- inserting said pig part into said gap (G1) opened by said pig part; and
- turning said one of said clamp structures into a position with said first face and said second face oriented generally downwards for said one of said clamp structures to carry said pig part by said first edge and said second edge biting into said pig part.

18. The method of claim 17, said first jaw and said second jaw mounted to turn about said axis (A) and a second axis, respectively, wherein said pig part is moved against said first face to open said gap (G1) by said portion of said pig part turning said first jaw and said second about said axis (A) and said second axis, respectively.

* * * * *